US009554287B2

United States Patent
Beale

(10) Patent No.: US 9,554,287 B2
(45) Date of Patent: *Jan. 24, 2017

(54) SYSTEM AND METHOD FOR REDUCING INTERFERENCE

(75) Inventor: Martin Warwick Beale, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 13/983,459

(22) PCT Filed: Jan. 25, 2012

(86) PCT No.: PCT/GB2012/050154
§ 371 (c)(1),
(2), (4) Date: Aug. 26, 2013

(87) PCT Pub. No.: WO2012/104606
PCT Pub. Date: Aug. 9, 2012

(65) Prior Publication Data
US 2013/0329592 A1 Dec. 12, 2013

(51) Int. Cl.
*H04L 12/26* (2006.01)
*H04W 24/02* (2009.01)
(Continued)

(52) U.S. Cl.
CPC .......... *H04W 24/02* (2013.01); *H04W 72/082* (2013.01); *H04W 28/048* (2013.01);
(Continued)

(58) Field of Classification Search
CPC ............ H04W 28/0236; H04W 52/28; H04W 28/048; H04W 72/082; H04W 72/10; H04W 24/02
(Continued)

(56) References Cited

U.S. PATENT DOCUMENTS 8,818,285 B2 * 8/2014 Borran et al. ............... 455/63.1
2008/0019334 A1 1/2008 Adams et al.
(Continued)

FOREIGN PATENT DOCUMENTS

EP 1077582 A1 2/2001
EP 2043402 A2 4/2009
(Continued)

OTHER PUBLICATIONS

Foreign Communication From a Related Counterpart Application, GB Application No. 11 2012 000 677.1; GB Office Action dated Apr. 23, 2014, 16 pages.
(Continued)

*Primary Examiner* — Guang Li
(74) *Attorney, Agent, or Firm* — Kevin Brown; Parker Justiss, P.C.

(57) ABSTRACT

A mobile communications system comprises a first group of one or more base stations which are arranged to communicate signals with mobile units via a wireless access interface by transmitting and/or receiving radio signals within a first frequency band; a second group of one or more base stations which are arranged to communicate signals with mobile units via a wireless access interface by transmitting and/or receiving radio signals within a second frequency band; and a controller. The controller is arranged in operation to determine an amount of interference in the first frequency band to radio signals for a first type of traffic where the interference is caused by radio signals for a second type of traffic in the second frequency band, wherein: the radio signals for the first type of traffic are to and/or from a first base station of the first group; and the radio signals for the second type of traffic are to and/or from to a second base station of the second group; and to, in response to the determined interference, generate instructions to influence
(Continued)

the second group in respect of the transmission of the radio signals for the second type of traffic in the second frequency band, wherein the instructions are generated based on at least a priority for the first type of traffic and a priority for the second type of traffic. In one example, the first group of one or more base stations may be providing communications services to human to human communications (H2H), whereas the second group of one or more base stations may be providing communications services supporting machine type communications (MTC), where H2H communications are prioritizes over machine type communications. The second group of one or more base stations is therefore instructed to take action to reduce the interference caused by the mobile unit.

38 Claims, 10 Drawing Sheets

(51) Int. Cl.
*H04W 72/08* (2009.01)
*H04W 28/04* (2009.01)
*H04W 72/10* (2009.01)
*H04W 72/12* (2009.01)
*H04W 88/08* (2009.01)

(52) U.S. Cl.
CPC .......... *H04W 72/087* (2013.01); *H04W 72/10* (2013.01); *H04W 72/1226* (2013.01); *H04W 88/08* (2013.01)

(58) Field of Classification Search
USPC ........................................ 455/435.3; 370/252
See application file for complete search history.

(56) References Cited

U.S. PATENT DOCUMENTS

| | | | |
|---|---|---|---|
| 2008/0160999 A1* | 7/2008 | Eklund ........................ | 455/436 |
| 2009/0069023 A1* | 3/2009 | Ahn ..................... | H04L 5/0007 |
| | | | 455/450 |
| 2009/0111506 A1* | 4/2009 | Laroia ................... | H04W 28/22 |
| | | | 455/550.1 |
| 2009/0124261 A1* | 5/2009 | Shimomura ........ | H04W 72/082 |
| | | | 455/436 |
| 2009/0268684 A1 | 10/2009 | Lott et al. | |
| 2010/0124181 A1* | 5/2010 | Hosein .......................... | 370/252 |
| 2010/0124924 A1* | 5/2010 | Cheng et al. ................. | 455/434 |
| 2010/0214941 A1* | 8/2010 | Hoole .......................... | 370/252 |
| 2010/0304685 A1 | 12/2010 | Wietfeldt et al. | |
| 2010/0322287 A1 | 12/2010 | Truong et al. | |
| 2011/0085457 A1* | 4/2011 | Chen et al. .................... | 370/252 |
| 2011/0237179 A1* | 9/2011 | Sagae ................... | H04W 48/10 |
| | | | 455/3.01 |

FOREIGN PATENT DOCUMENTS

| | | |
|---|---|---|
| GB | 2390953 A | 1/2004 |
| WO | 2004004140 A2 | 1/2004 |
| WO | 2009085716 A1 | 7/2009 |
| WO | 2009099473 A2 | 8/2009 |
| WO | 2009114640 A2 | 9/2009 |
| WO | 2012104606 A1 | 8/2012 |

OTHER PUBLICATIONS

Foreign Communication From a Related Counterpart Application, PCT Application PCT/GB2012/050154, International Search Report dated Apr. 12, 2012, 5 pages.
Foreign Communication From a Related Counterpart Application, GB Application No. 1101851; GB Examination Report dated Sep. 17, 2014, 5 pages.

* cited by examiner

SYSTEM AND METHOD FOR REDUCING INTERFERENCE

CROSS-REFERENCE TO RELATED APPLICATION

This application is the National Stage of, and therefore claims the benefit of, International Application No. PCT/GB2012/050154 filed on Jan. 25, 2012, entitled "SYSTEM AND METHOD FOR REDUCING INTERFERENCE," which was published in English under International Publication Number WO 2012/104606 on Aug. 9, 2012, and has a priority date of Feb. 3, 2011, based on application GB1101851.2. Each of the above applications is commonly assigned with this National Stage application and is incorporated herein by reference in its entirety.

FIELD OF THE INVENTION

The present invention relates to mobile communications systems and method which are adapted to reduce interference.

BACKGROUND OF THE INVENTION

Mobile radio systems provide a radio access interface via which data can be communicated with mobile units, also called terminals or user equipments (UEs). There are various techniques for communicating data to a plurality of terminals contemporaneously, whilst making most efficient use of an available radio communications bandwidth. Different radio communications systems are typically using different frequency bands which are allocated to different technologies and/or operators. For example, in the frequency bands defined in the 3GPP standard GSM 900, the band 890-894.6 MHz has been allocated in the United Kingdom to Vodafone and the band 894.8-902 MHz to O2. Each operator is then in charge of allocating carrier frequencies to be used in communications where the carrier frequencies are in the band or bands allocated to this operator.

The spectrum can also be divided between technologies available for a standard. For example, the 3G standard defines Frequency Division Duplexing (FDD) and Time Division Duplexing (TDD) radio communications and separate parts of the spectrum may be allocated to each of them.

The spectrum is usually divided into different bands that do not overlap each other in order to reduce the risk of interference between signals in these different bands. However, in reality, communications in separate but neighbouring frequency bands may interfere with each other, as a result for example of out of band interference. This interference can cause a significant signal to noise ratio degradation or carrier to interference ratio degradation which effectively causes a loss in capacity to the mobile radio network. A common way of mitigating a reduction in signal quality and/or strength is to increase transmission power. However doing so in the case of interfering radio signals in a mobile radio network can actually increase the interference and can therefore decrease the network's capacity.

In some countries different mobile radio networks and/or different parts of a mobile radio network using different wireless access interfaces are provided with frequency bands which are neighbouring one another. Reducing interference between frequency bands from different wireless access interfaces can therefore represent a technical problem.

SUMMARY OF THE INVENTION

According to an aspect of the invention, there is provided a mobile communications system comprising a first group of one or more base stations which are arranged to communicate signals with mobile units via a wireless access interface by transmitting and/or receiving radio signals within a first frequency band; a second group of one or more base stations which are arranged to communicate signals with mobile units via a wireless access interface by transmitting and/or receiving radio signals within a second frequency band; and a controller. The controller is arranged in operation to determine an amount of interference in the first frequency band to radio signals for a first type of traffic where the interference is caused by radio signals for a second type of traffic in the second frequency band, wherein: the radio signals for the first type of traffic are to and/or from a first base station of the first group; and the radio signals for the second type of traffic are to and/or from to a second base station of the second group; and to, in response to the determined interference, generate instructions to influence the second group in respect of the transmission of the radio signals for the second type of traffic in the second frequency band, wherein the instructions are generated based on at least a priority for the first type of traffic and a priority for the second type of traffic.

In some embodiments, the first group of one or more base stations is comprised in a first radio network and the second group of one or more base stations is comprised in a second radio network.

The controller may be operable to determine an amount of interference which is being caused or is likely to be caused to radio signals of a first type with a first base station by a mobile unit communicating radio signals of a second type with a second base station. In one example, the first base station may be providing communications services to human to human communications (H2H), a first type of traffic, whereas the second base station may be providing communications services supporting machine type communications (MTC), a second type of traffic. The controller generates instructions to the second base station to take action to reduce the interference caused by the mobile unit on the radio signals for the first type of traffic.

Mobile radio networks are designed to operate at a certain minimum carrier to interference ratio and include measures to control the interference caused by mobile units to other mobile units. This is also true for 3GPP standards which provide for example means for a radio cell to adjust its own settings (redundancy, power, etc.) in order to try to reduce the level of interference. However, such means are not always sufficient to reduce interference to a satisfactory level and, in fact, operators do not use some parts of the spectrum in order to avoid interference. One example is a frequency spectrum allocated to a TD-CDMA mobile radio network and a neighbouring W-CDMA frequency band, because out-of-band interference from the TD-CDMA frequency band is considered to increase interference to the W-CDMA frequency band. Thus where a 3G TDD TD-CDMA band and a 3G FDD WCDMA band are neighbouring each other, interference can occur near the boundary of the two frequency bands. In that example situation, because FDD is most commonly used in some of these countries, operators have decided not to use the TDD band to prevent a quality of service reduction in the FDD band. In effect, this TDD band is used as a guard band to protect the FDD band from interference. However, this results in a waste of frequency resources. As frequencies are limited resources, this use of the TDD band as a guard band is inefficient and if possible would preferably be avoided. More generally it is not satisfactory for the operators to choose between not using part of the spectrum and creating a high level of interference.

In one embodiment the interference determined by the controller may include calculating an amount of interference which can be tolerated by radio signals for the first type of traffic by the transmission of radio signals for the second type of traffic in the second frequency band, and in response to the instructions indicating the calculated amount of interference, the second group of one or more base stations may be arranged in operation to control the transmission of radio signals for the second type of traffic in the second frequency band to be within the amount of interference which can be tolerated by radio signals for the first type of traffic. For example, the calculated amount of interference which can be tolerated by the radio signals for the first type of traffic may be a function of an amount of communications traffic provided by the first group of one or more base stations to the attached mobile units.

In one example embodiment the generated instructions may include instructions to transfer a mobile unit attached to a base station to a different base station.

In another example the generated instructions may include instructions to change at least part of the communications for the second type of traffic in the second frequency band to a different carrier frequency or a different carrier frequency within the second frequency band.

Various further aspects and features of the present invention are defined in the appended claims and may include a method of communicating in a mobile communications system using radio signals.

BRIEF DESCRIPTION OF THE DRAWINGS

Example embodiments of the invention will now be described with reference to the accompanying drawings in which like parts have the same designated references and in which.

DESCRIPTION OF EXAMPLE EMBODIMENTS

Figure 1:
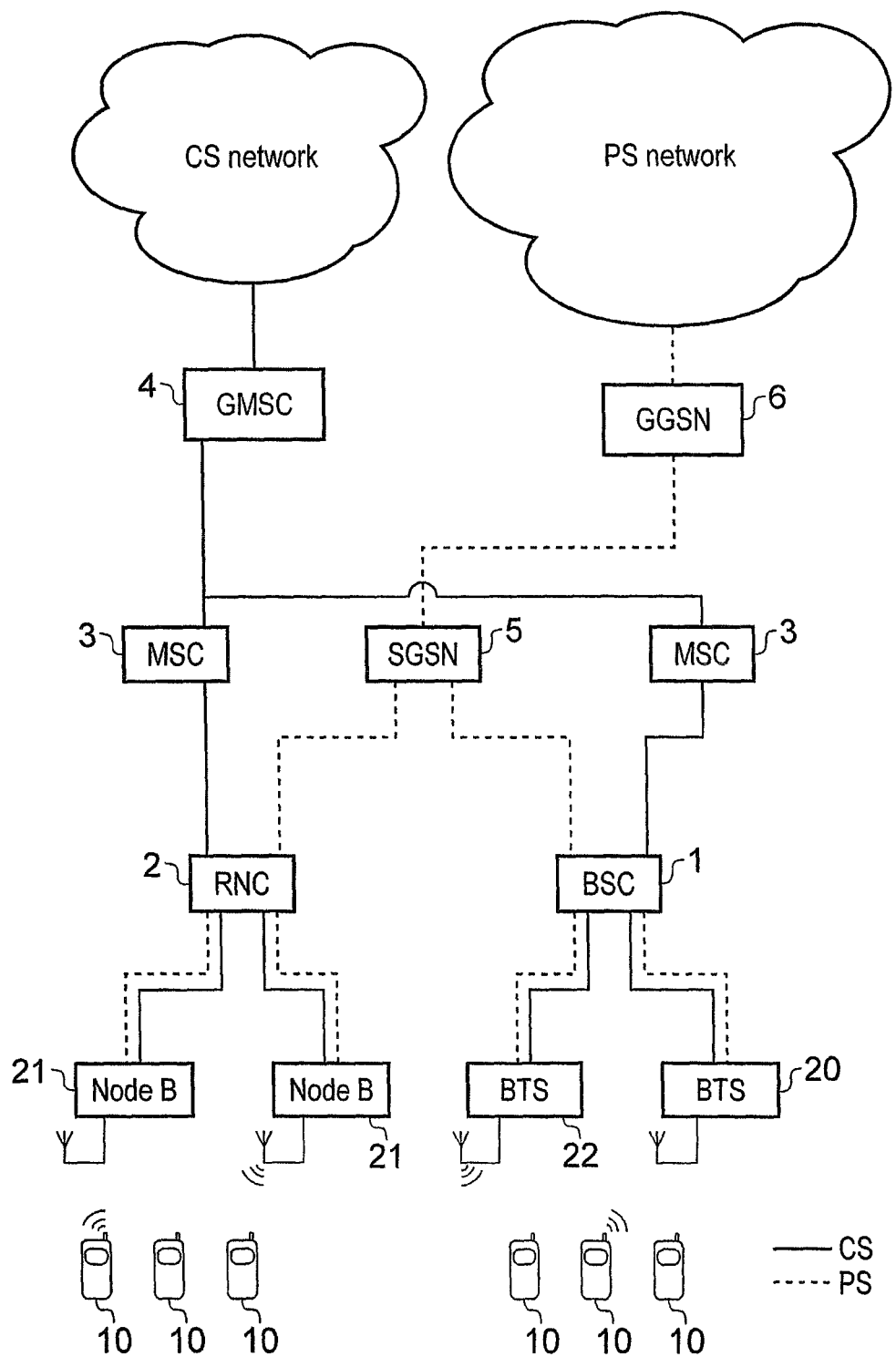
FIG. 1 is a schematic representation of a 2G-3G mobile network.

The 3rd Generation Partnership Project (3GPP) defines standards for mobile networks which are being widely used across the world. Such standards include for example the GSM/GPRS standards and 3G standards. FIG. 1 is a schematic representation of a 2G/3G mobile network. Terminals or User Equipments 10 are attached to base stations 20, 21 and are able to communicate data to and from another party via the base stations using radio communications.

In GSM/GPRS, the base stations are referred to as "Base Transceiver Station" (BTS) 20; whereas in 3G, they are referred to as "NodeB" 21. Those base stations are then connected to a radio controller 1, 2 that may control more than one base station. In GSM/GPRS, such a controller is called a "Base Station Controller" (BSC) 1; and in 3G, the controller is referred to as a Radio Network Controller (RNC) 2. This part of the network is commonly referred to as the Radio Access Network (RAN) part of the mobile network.

Mobile radio networks also include a core network part, which includes different equipments depending on the type of traffic: packet or circuit. Packet-type traffic is also sometimes referred to as "Packet-Switched" (PS) traffic and circuit-type traffic as "Circuit-Switched" (CS) traffic. CS traffic was historically used for voice traffic whiles PS traffic was historically used for data traffic, even though today PS traffic can be used to carry voice (VoIP) and CS traffic to carry data (e.g. SMS). CS traffic is communicated from/to the BSC 1 and RNC 2 to/from the Mobile service Switching Centre (MSC) 3 and in the event that the traffic has to be directed to another network, for example the legacy fixed telephone network, it is directed to a Gateway MSC (GMSC) 4. PS traffic, usually carrying IP traffic, is communicated from/to the BSC 1 and RNC 2 to/from the Serving GPRS Support Node (SGSN) 5 and, in the event that the traffic has to be directed to a different network, for example the Internet, it is directed to a Gateway GPRS Support Node (GGSN) 6.

Figure 2:
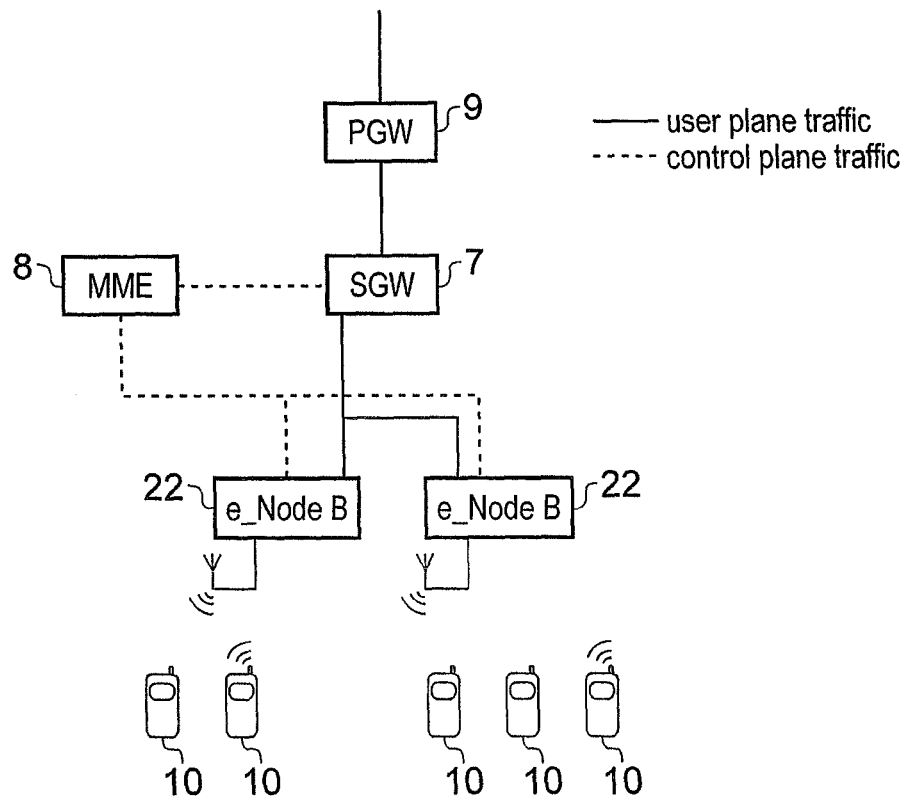
FIG. 2 is a schematic representation of an LTE mobile network.

More recent standards include the Long Term Evolution (LTE) standards, also defined by the 3GPP. LTE networks are expected to become widely available in the coming years. FIG. 2 is a schematic representation of an LTE network. LTE is a packet-based standard for all types of traffic. The terminals are attached to an e-NodeB 22, the LTE base station. The e-NodeBs are then connected to two elements: the Serving Gateway (SGW) 7 for user plane traffic and the Mobility Management Entity (MME) 8 for control plane traffic. User plane traffic is then directed to or from a PDN Gateway (PGW) 9 which can provide access to an external network, for example the Internet.

The examples below are all set up in a 3G environment, however it will be apparent to the skilled person that they can be transposed to other 3GPP mobile networks (GSM/GPRS, LTE, etc.) and to other non 3GPP networks.

Figure 3A:
FIGS. 3A and 3B are example of spectrum distribution in a TD-CDMA system and W-CDMA system.
Figure 3B:
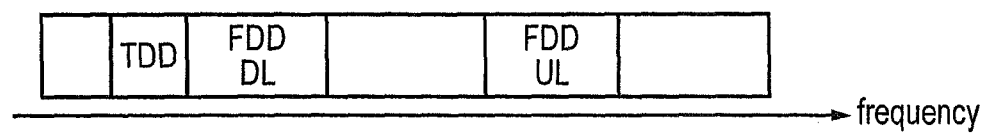

FIGS. 3A and 3B represent possible spectrum distributions into bands, each allocated to a specific usage and/or users. In the example of FIG. 3A, the TDD band contains at least one carrier frequency, where each carrier frequency is used for both uplink (UL) and downlink (DL) communications, and the FDD band contains at least two carrier frequencies: one frequency used for UL communications and one used for DL communications. In this example, the TDD band is adjacent to the FDD UL band. Thus the TDD carrier frequency is located adjacent to one of the FDD UL carrier frequencies at the boundary of the two frequency bands, and hence, out of band interference from one of the bands can cause interference in the other band. As a result, the operators are particularly concerned about TDD signals causing interference in the widely used FDD UL band. Currently, as a result, operators in that situation tend not to use carrier frequencies in the TDD band that are adjacent to carrier frequencies in the FDD band. However such an approach results in a loss in available frequency resources and is therefore unsatisfactory.

FIG. 3B shows a different band allocation for TDD and FDD bands where some carrier frequencies in the TDD band neighbour carrier frequencies in the FDD DL band. Of course, the invention is not limited to interference occurring with a spectrum allocation similar to those of FIGS. 3A and 3B. The invention may be put to use in any environment where a first type of traffic using a carrier frequency in one band causes interference to a second type of traffic using another carrier frequency in a neighbouring band. It could for example be used when two FDD-DL neighbouring bands create an out-of-band interference situation between two types of traffic. In another example, the invention could be put to use when a first TDD carrier operating with a first association of timeslots to UL and DL communication directions in a frame causes interference to a second TDD carrier operating with a second association of timeslots to UL and DL communication directions in a frame.

Example embodiments will now be described in the contexts described in FIGS. 3A and 3B, with adjacent TDD and FDD bands, and where the TDD band is mainly used for Machine-Type Communications (MTC) and the FDD is mainly used for Human to Human (H2H) communications. MTC communications can for example be communications from or to vending machines (e.g. for sending the current stock levels or for receiving the latest products' prices), building security devices, medical devices, car devices (e.g. a GPS or an anti-stealing car device), etc. H2H communications can for example be phone calls, text messages, web browsing, video on demand, etc.

However, it will be understood that the invention is not limited to this particular MTC-TDD and H2H-FDD environment and that the invention relates to interference involving at least two different types of traffic, where each type of traffic has a priority. Any environment may be suitable, for example, the bands may be allocated to different radio technologies or the same radio technology; they may be neighbouring bands but not strictly adjacent; the radio technologies may or may not be as defined in the 3GPP standards; and a different number of terminal and base stations may be involved. Also the bands may not be generally used for one type of communications only (e.g. MTC only or H2H only) and/or may be used for another type or combination of types of communications.

Interference Controller/Enforcer

A controller is provided for reducing interference and thereby enabling a more efficient use of frequency resources, for example resources previously disregarded due to the interference risk. In operation, the controller determines an interference level to radio signals for a first type of traffic in a first frequency band used by a first radio communications apparatus, for example a first base station, from radio signals for a second type of traffic and in a second frequency band used by a second radio communications apparatus, for example a second base station. For example, interference may be caused by communications from and to terminals of the second base station which are near terminals served by the first base station.

The controller can, depending on the determined interference, generate instructions for the second radio communications apparatus for controlling the transmission of radio signals for the second type of traffic in the second frequency band. The controller can generate instructions which depend on priorities for the first and second types of traffic. Thus, if for example the first type of traffic has a higher priority than the second type of traffic, the controller will generate instructions for reducing the level of interference to the first type of traffic where these instructions may negatively affect the second type of traffic more than the first type of traffic, if there is any negative effect. The instructions are generated by the controller so that they result in a reduction or reduction of the level of interference.

Figure 4A:
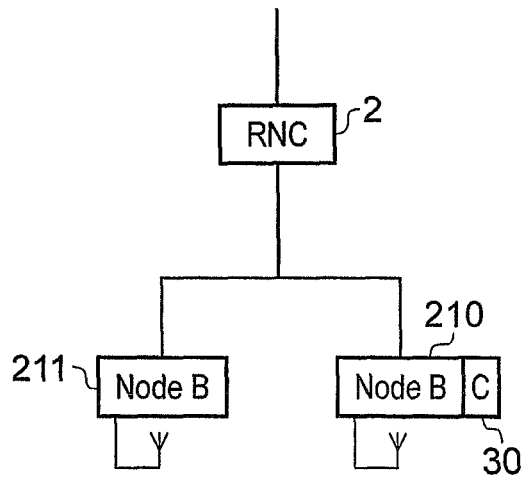
FIGS. 4A, 4B and 4C are examples of possible locations in a 3G network of a controller for reducing interference.
Figure 4B:
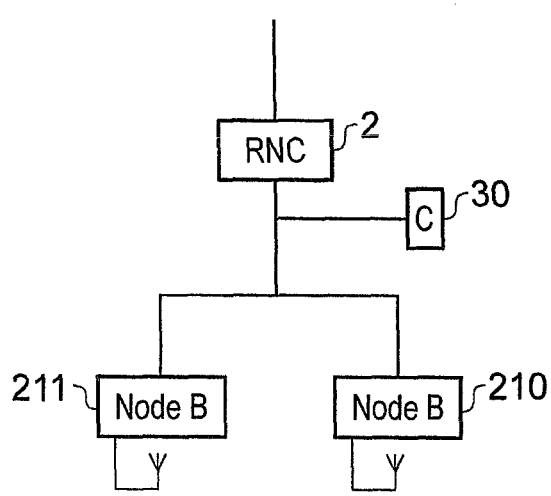
Figure 4C:
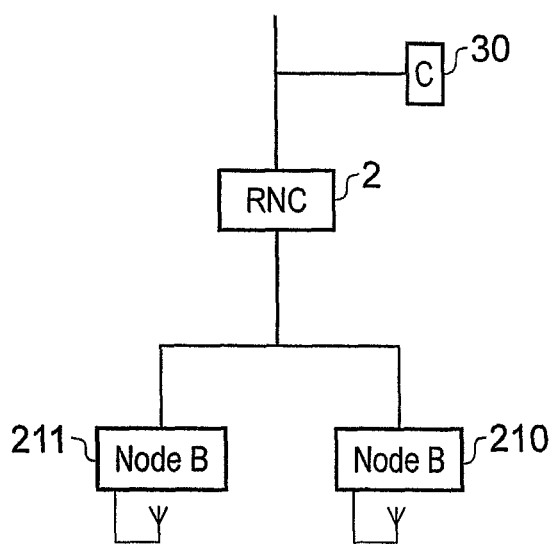

The controller may be conveniently located at any position within or outside the mobile radio network. As shown in FIG. 4A, the controller 30 may be co-located with or located within a NodeB (i.e. a 3G base station) 210. It may also be simply connected to a base station without being co-located with it (not shown). In the example of FIG. 4B, the controller 30 is a standalone element connected to the mobile network at a point between the RNC 2 and NodeBs 210 and 211. In the example of FIG. 4C, the controller 30 is connected to the mobile network further away from the NodeBs, also as a standalone element.

Figure 4D:
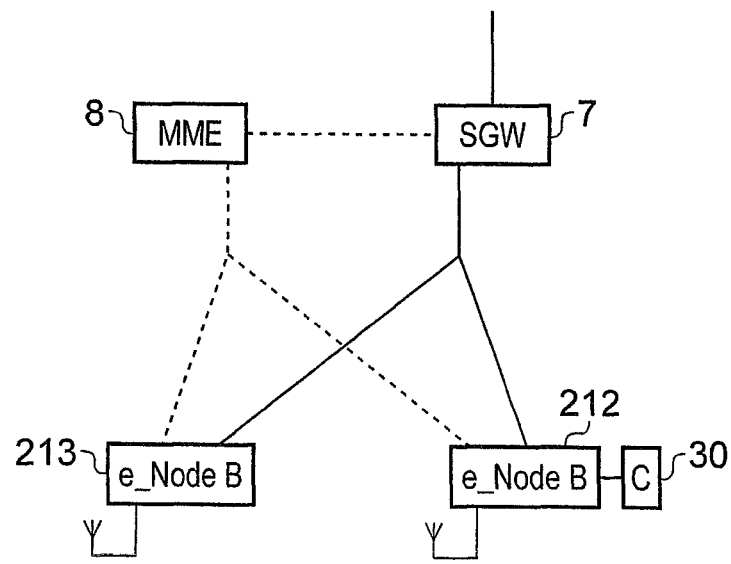
FIGS. 4D and 4E are examples of possible locations in a LTE network of a controller for reducing interference.
Figure 4E:
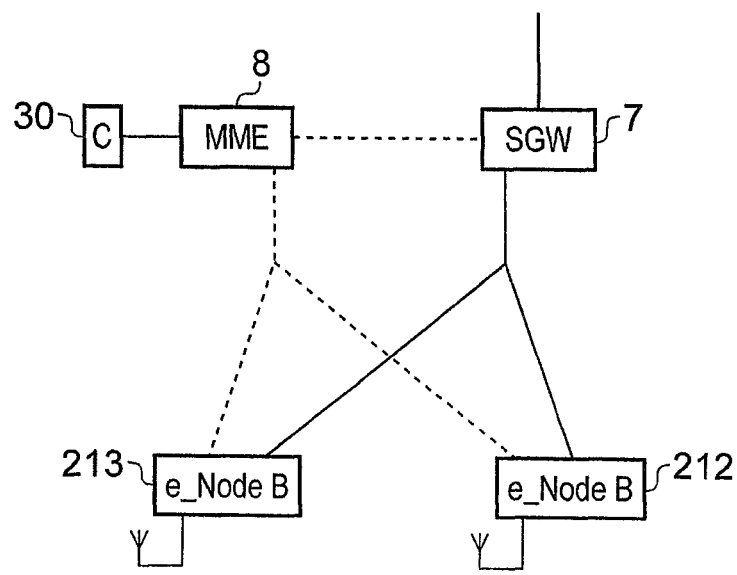

In the examples of FIG. 4D, the controller 30 is co-located with or located within a e-NodeB (i.e. a LTE base station) 212, whereas in the example of FIG. 4E, it is directly connected to an MME 8, also in LTE network. It can also be connected to more than one network element and/or mobile networks and to elements using different technologies (e.g. to a BTS, to a NodeB and to a e-NodeB). In general and as explained above, the controller 30 may be placed at the any suitable location. Consequently, in the example of a 3 GPP or 3 GPP-like mobile network, the controller may also be found at different locations, such as within a base station (BTS, NodeB or e-NodeB); within an RNC/BSC; within a MSC/SGSN; within a MME; within a SGW; partially within any of the previously listed elements in combination; or at any other suitable location. It might also be for example a standalone element that may be connected to any of the previously listed elements, where this standalone element may for example be an application server in an IMS environment; form part of another element; or be distributed in different standalone servers and/or network elements.

The types of traffic can be identified in different manners, for example with a service ID; a terminal ID; terminal profile (e.g. terminals for emergency communications can be identified as such in a profile); a base station ID; and/or a base station profile. They can also be identified using any combination of the preceding elements with other suitable elements, such as a time of day, a timer, a location, etc.

The interference determined by the controller 30 and used for generating instructions may be, for example, a measured level of interference or a predicted level of interference based on a current and/or expected traffic level.

The controller 30 can therefore dynamically influence the communications between terminals and the base stations so as to improve the quality of service for different types of traffic having different respective priorities. As a result, such a controller enables the use of carrier frequencies within frequency bands which were previously excluded from use because of interference with carrier frequencies in other neighbouring bands. For example, where one or more carrier frequencies in the TDD band would not have been used because of the interference it or they may cause to one or more carrier frequencies in the FDD band, it or they can now be used, as the controller can limit the impact on carrier frequencies of the neighbouring bands.

Owing to the approach of the invention to an interference situation taking into consideration the different types of traffic involved, a more flexible system is provided where instead of an interference problem leading to one or more of the carrier frequencies being unused due to possibly caused interference, the interference problem can be avoided altogether or in large part Various examples of instructions that can be generated by the controller will now be illustrated in the following examples. Even if those examples are presented separately, the skilled person will understand that they can be combined. For example, the instructions could combine instructions to handover of a terminal to a different base station and instructions for power control.

1. Handover of a Terminal to a Different Base Station

In a first and preferred example, the controller may generate instructions for one or more terminals to be transferred from one base station to another base station.

Figure 5A:
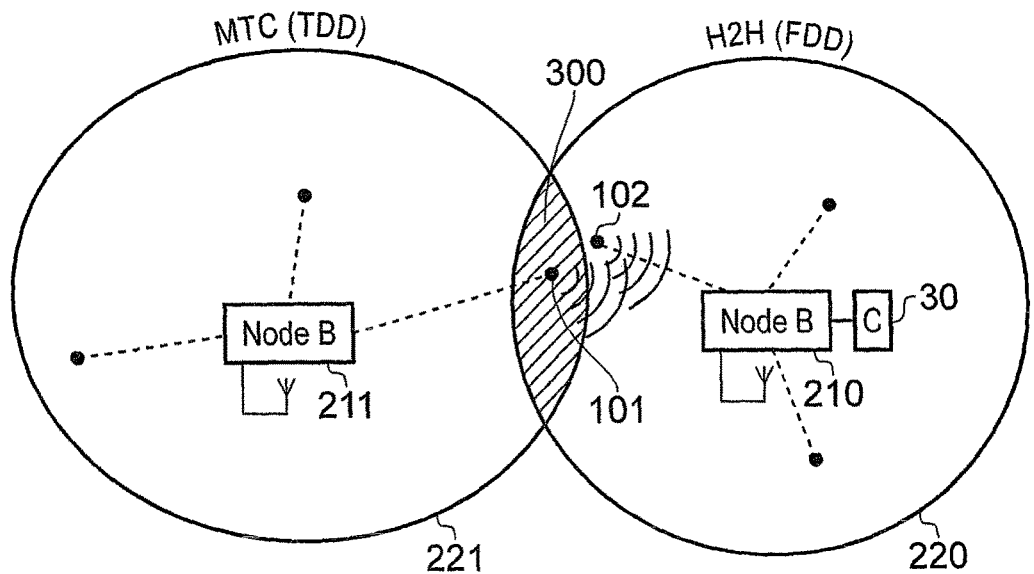
FIGS. 5A and 5B show an example of a transfer of a terminal for reducing interference.

FIG. 5A shows a situation where a first base station 210 being generally used for H2H communications and communicating with terminals using FDD and a second base station 211 being generally used for MTC communications and communicating with terminals using TDD have an overlap in range. The base stations 210 and 211 could for example be co-located. The lines 220 and 221 show the transmission range for each of the two base stations 210 and 211, respectively.

If the TDD band is adjacent to the FDD-UL band, as in FIG. 3A, then downlink and uplink communications in the TDD domain can cause interference to UL transmissions from an FDD terminal. In particular, if the FDD terminal is near a TDD terminal, then UL/DL transmissions from/to the TDD terminal can affect UL transmissions from the FDD terminal.

Likewise if the TDD band is adjacent to the FDD-DL band, as in FIG. 3B, then downlink and uplink communications in the TDD domain can cause interference to DL transmissions from an FDD base station to an FDD In particular, if the FDD terminal is within the range of the TDD base station, TDD-DL transmissions from the TDD base station can affect the FDD transmissions to the FDD terminal. For example, as can be seen on FIG. 5A, a downlink signal interference zone 300 may then appear. UL transmissions from a neighbouring TDD terminal can also affect DL transmissions to the FDD terminal.

Because the current standards fail to address this out-of-band interference situation in a satisfactory manner, this results in operators not using a TDD band to avoid any loss of quality of service for terminals using the preferred FDD band. In contrast, the present invention enables for example the use of carrier frequencies in this TDD frequency band for traffic which has a lower priority in comparison with conventional traffic.

For example, because MTC communications are usually less time-critical than H2H communications, the H2H communications may be prioritized over the MTC communications. In the rest of the description of the examples, it will be assumed that H2H communications have a higher priority than MTC communications, even though it will apparent to the skilled person that the application is not limited to H2H and MTC traffic and that the invention may be used with any types of traffic.

For example, in the situation of FIG. 5A, because terminal 101 neighbours terminal 102, uplink signals from terminal 101 may cause interference to signals from and/or to terminal 102. With a spectrum allocation like that of FIG. 3A, because the TDD band is adjacent to the FDD-UL band, uplink signals from terminal 101 may cause interference to uplink signals from terminal 102. Also, DL transmissions from base station 211 may interfere with UL transmissions from terminal 102: this problem is especially pronounced if base station 211 is co-located with base station 210. In the rest of the example, it will be assumed that the bands are as in FIG. 3A.

In this example, the controller 30 estimates that the interference situation from high priority traffic of terminal 101 can be improved by transferring terminal 101 to the first base station 210. Therefore, the controller 30 generates instructions to transfer terminal 101 from the second base station 211 to the first base station 210. Once the instructions have been enforced, the terminal 101 is then served by the first base station 210.

Figure 5B:
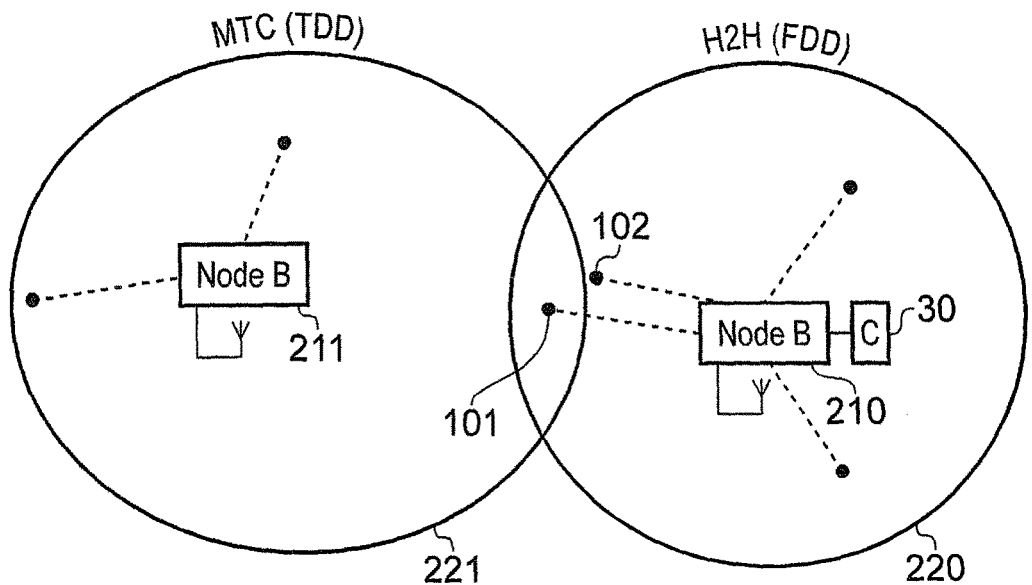

In FIG. 5B, where terminal 101 has been handed over to base station 210 following the enforcement of the instructions generated by the controller 30. Terminal 101, previously served by the second base station 211 and previously using a carrier frequency in the TDD frequency band, has to change to different carrier frequencies in the FDD band and from TDD communications to FDD communications. More generally, the handover of a terminal to a new base station may require a change in the carrier frequencies used and/or in the technology used (e.g. TDD to/from FDD, 2G to/from 3G, TDD LTE to FDD LTE etc.).

By instructing the terminal 101 to change from the second base station 211 to the first base station 210, the interference can thereby be reduced. Because the terminal 101 is now attached to and served by the first base station 210, it does not cause any interference to signals from terminal 102 also served by the first base station 101. In effect terminals 101-102 are served by the same base station 210 which manages and schedules communications with its terminals so as to limit interference. Therefore, after the transfer of terminal 101 to the first base station 210, terminal 101 is managed so that the interference it may cause to terminal 102 when sending uplink signals is limited and controlled. As a result, there is an overall improvement of the global quality of service.

In this example, terminal 102 may operate with a first type of traffic and terminal 101 may operate with a second type of traffic. Base station 210 may preferably operate with the first type of traffic. However base station 210 might improve operation to the first type of traffic by having terminal 101 handed over to it and by being able to more accurately control the interference generated by terminal 101 operating with the second type of traffic E.g. terminal 102 may operate with H2H traffic and base station 210 may preferably support H2H communications whereas terminal 101 may operate with MTC communications, but it may be preferable for the base station 210 to also control MTC terminal 101 in order to better control the interference situation in the H2H network.

Likewise, if terminal 101 can be transferred from the first base station 210 to the second base station 211 without causing interference to H2H communications or causing interference but below an acceptable level, the controller 30 can then instruct terminal 101 to be transferred back to the second base station 211. This can become useful if for example terminal 101 is an MTC terminal which is therefore preferred on the MTC/TDD network than the H2H network where H2H terminals are preferred. As soon as the resulting level of the interference is considered as acceptable, the controller 30 can then instruct the terminal 101 to be handed over back to the initial base station (or any other suitable base station), that is, the second base station 211 in the example of FIGS. 5A-5B.

The controller 30 may also take geometry measurements into account to generate the instructions. Geometry measurements can include for example relative positions of terminals with respect to the base stations via which they are or may be communicating and/or absolute positions, e.g. GPS coordinates; or terminal measurements of the received power from the serving cell and measurements of the received power from one or more neighbouring cells.

In a further example, a terminal may be configured to always connect to the H2H network first, regardless of its profile (e.g. MTC or H2H profile). MTC terminals may then be transferred to the MTC network, but only if such a handover is appropriate in terms of the amount of interference the terminal may cause. In contrast, H2H terminals for H2H traffic would not be handed over to the MTC network and would remain in the H2H network. In this particular example, the controller is therefore also operable to instruct the handover of a non-interfering terminal to a base station where the terminal could then cause interference.

The handover may be performed in any suitable way and may be for example a network initiated or a mobile initiated handover. If for example the instructions generated by the controller 30 are received for enforcement by a network element, the handover may be network initiated. If however handover instructions are for example received for enforcement by a terminal, the handover may then be initiated by the terminal. The various elements involved in the handover may re-use existing means and processes or may implement new ones to achieve the transfer of one or more terminals to a different base station.

2. Instructions Regarding Power Control

One way of reducing interference is to adjust the power transmitted by a base station and/or terminal causing interference. This can be done using various means or methods and, to some extent, depends on whether the interference is in the uplink or downlink communication direction for the parties involved in the interference.

The instructions may include specific power control instructions and/or generic power control instructions from which the actual power adjustment is determined. These instructions may be used to adjust the power settings of for example one or more base stations and/or of one or more terminals. Specific power control instructions can for example include detailed power settings and/or adjustments. Generic instructions can for example be instructions to adjust power settings so as to not go over a maximum power and let the base station (or base stations) adjust their power settings accordingly.

Power Control Example 1

Downlink Power Control (TDD/FDD-DL)

Figure 6A:
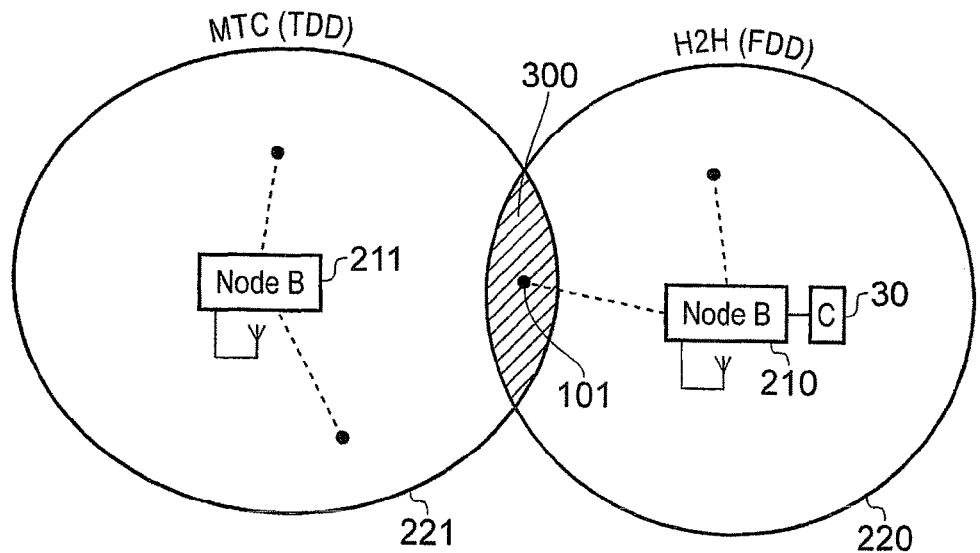
FIGS. 6A and 6B show an example of power control adjustment for reducing interference.
Figure 6B:
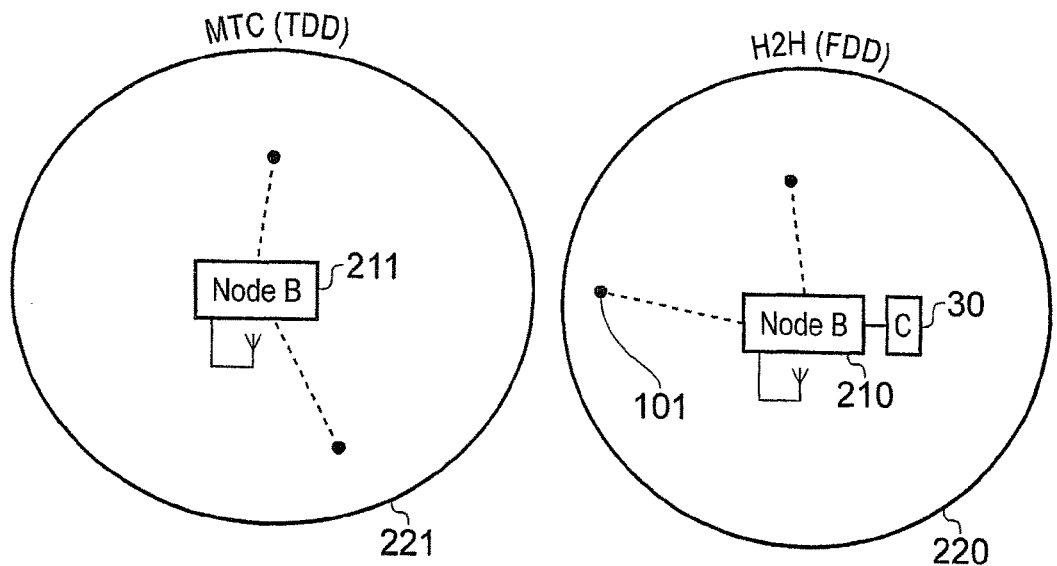

In the example of FIG. 6A and assuming that the TDD band is adjacent to the FDD-DL band (see for example FIG. 3B), the controller 30 receives reports of interference or any other type of information from which the controller can estimate an amount of interference caused by MTC traffic in the TDD band to H2H traffic in the FDD band. The controller 30 may use a measured level of interference, an estimated level of interference or a predicted level of interference based on, for example, a current traffic level, a number of active UEs, time of day and day of week, etc. The controller 30 may in that example use reports, such as interference measurements, from the H2H terminal 101 in the downlink interference zone 300 where downlink communications to MTC terminals are interfering with downlink communications to H2H terminals. The controller 30 then generates instructions in order to reduce interference based at least on the fact that H2H traffic has a higher priority than MTC traffic. In that example, the controller 30 then generates instructions for the second base station 211 in order to reduce the level of interference in the H2H network by adjusting its power settings. The controller 30 may also generate instructions for the first base station 210. As a result, the controller 30 generates instructions so that the second base station 211 reduces its transmission range, whilst still covering all terminals it already serves. In that example, the controller 30 could also generate instructions so that the first base station 210 increases its transmission power and range. FIG. 6B shows a possible result of the instructions being enforced by the second base station 211. In FIG. 6B, the TDD and FDD cells do not overlap, thereby preventing any interference between the downlink FDD and TDD signals.

If the two base stations are co-located, instructions to avoid a possible total reduction of the TDD base station 211 transmission power can for example be a request for the second base station 211 to turn one of its sectors off. As a result, it can still use the other sectors, if any, while switching off the identified sector can reduce or cancel interference caused by downlink TDD signals from this sector to signals on a carrier frequency in the adjacent FDD-DL band.

Because the second base station 211 has reduced and/or adjusted its transmission range, this may affect the quality of service for the terminals served by this base station 211, in particular for terminals previously or now on the cell's border. However, the quality of service for downlink H2H traffic is significantly improved in the previous interference zone and remains unaffected outside of this zone. Also, MTC traffic may still be communicated, albeit with a potential reduction in quality for the terminals in cell 221.

Owing to this approach, MTC traffic can still be communicated between the second base station 211 and its terminals at the same time as the H2H base station 210 communicates, with the higher priority traffic being unaffected and the lower priority traffic having a possibly lower quality of service. This is therefore a significant improvement to the previous approach which in effect resulted in the TDD band not being used, thereby wasting available carrier frequencies in the TDD band.

As an illustration, in this example, the controller 30 is co-located with or connected to the first base station 210, which is mainly used for the higher priority traffic and generates instructions for the second base station 211, which is mainly used for lower priority traffic. In other words, in this specific example, the H2H network acts as a master to the MTC network by controlling the interference it is allowed to create using the controller 30. As the H2H network may also cause interference in the MTC network, the MTC network should also be allowed to tolerate such interference and it may therefore be informed of the amount of transmission on the H2H network and/or be given instructions to facilitate coping with the interference (e.g. instructions to increase redundancy in the messages for improving error correction). The MTC network may then take decisions in respect of its settings and configuration, provided that these decisions are within the constraints imposed by the H2H network, i.e. by the instructions.

Also, starting from FIG. 6B, if the terminal 101 previously in the downlink interference zone 300 is turned off at a later point in time, then the controller 30 may generate instructions for the second base station 211 to re-adjust its power settings and in effect increase its range to the range shown in FIG. 6A if appropriate. Even though it may re-create the downlink interference zone 300 as shown in FIG. 6A. This would in effect improve the quality of service for all terminals served by the first and second base stations 210 and 211 without causing any interference to the H2H traffic because there isn't any terminal in zone 300.

Figure 7A:
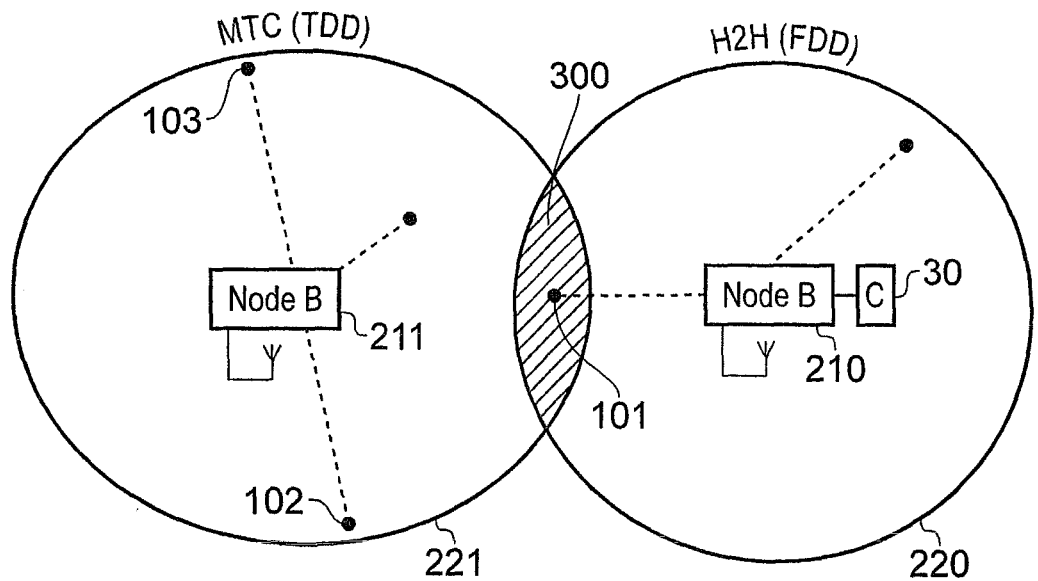
FIGS. 7A and 7B show a further example of power control adjustment.
Figure 7B:
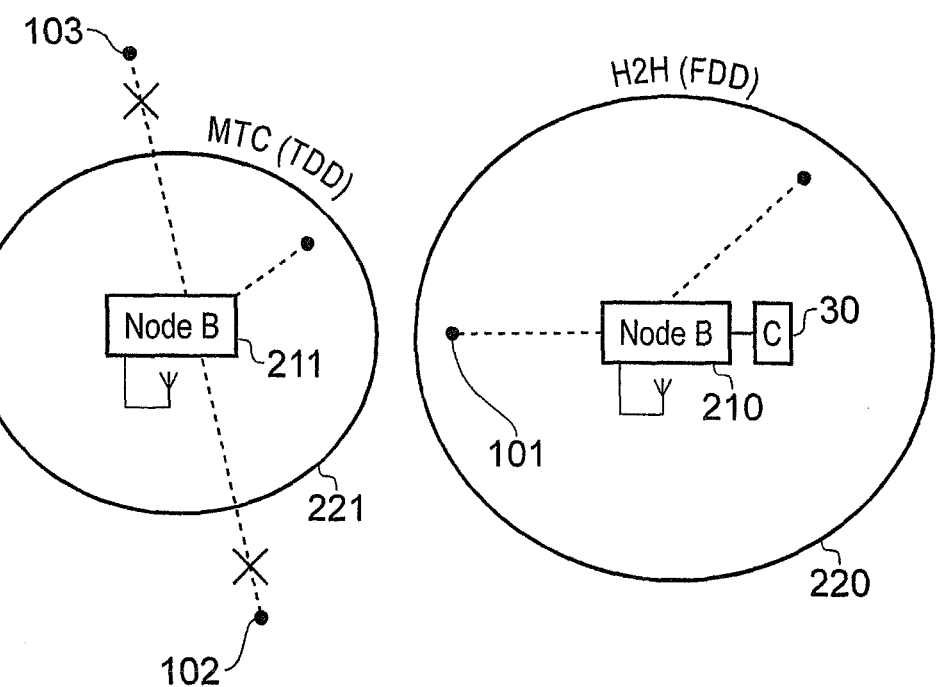

Furthermore, the controller 30 is not limited to generating instructions where all terminals can still be served by the base stations after the instructions have been enforced. For example, in the situation shown in FIG. 7A, the two base stations 210 and 211 overlap in range, thereby creating a downlink interference zone 300 as in FIG. 6A, but neither base station can reduce its range so that the interference zone 300 does not cover terminal 101 anymore while serving every terminal of FIG. 6A. Because H2H traffic has a higher priority than MTC traffic, the controller will attempt to limit the negative effects on the quality of service of H2H traffic as much as possible even if it results in a loss of quality of service for MTC traffic. The controller 30 can for example generate instructions such that the second base station 211 reduces its transmission power in order to have terminal 101 out of range foe the second base station 211, i.e. out of the downlink interference zone 300. As a result, MTC terminals previously located at the edge of the range of the second base station 211 may be then out-of-range for the MTC base station 211, as shown for example in FIG. 7B. The two terminals 102 and 103 which were previously served by the second base station 211 can not be served by this base station once it has reduced its range. These instructions therefore result in a loss of service for these terminals but the interference has been reduced in the H2H network which has been prioritised over the MTC network.

Power Control Example 2

Uplink Power Control (TDD/FDD-UL)

In a further example related to power control (not shown), the controller 30 may instruct the second base station 211 to limit the interference caused by uplink signals for MTC traffic in the TDD band from one or more terminals on H2H communications in the FDD band from or to the first base station 210.

Assuming the frequency bands are as described in FIG. 3A, uplink TDD signals from an MTC terminal may cause interference on the uplink signals from a neighbouring H2H terminal. This is shown for example in FIG. 5A where terminal 101 causes interference to uplink signals from terminal 102 when both terminals send uplink signals. It is noteworthy that if the frequency bands were as shown in FIG. 3B, then uplink signals from a MTC terminal using a carrier frequency in the TDD band could still cause interference to H2H traffic, but the interference would then be with the downlink signals to terminal 102.

In order to reduce the interference effects of uplink signals in such a configuration, the controller can for example instruct the second base station to have the transmitting power for this or those specific terminals reduced so that the amount of interference they cause on uplink traffic from a neighbouring terminal using a carrier frequency in the FDD band is reduced. Alternatively, the controller can also directly instruct the terminals to reduce their transmitting power. The controller can therefore reduce interference caused by MTC traffic on uplink H2H traffic in the FDD band to a satisfactory level. Instructions in respect of uplink power control adjustment for one or more terminals may also be used in combination with adjusting downlink power control for one or more base station.

3. Communications Scheduling

In a further example, the controller 30 can instruct the MTC network to arrange and/or schedule its communications in order to reduce interference. For example, the second base station 211 may be instructed to delay non-time sensitive communications to achieve an interference budget as instructed by the controller.

Figure 8A:
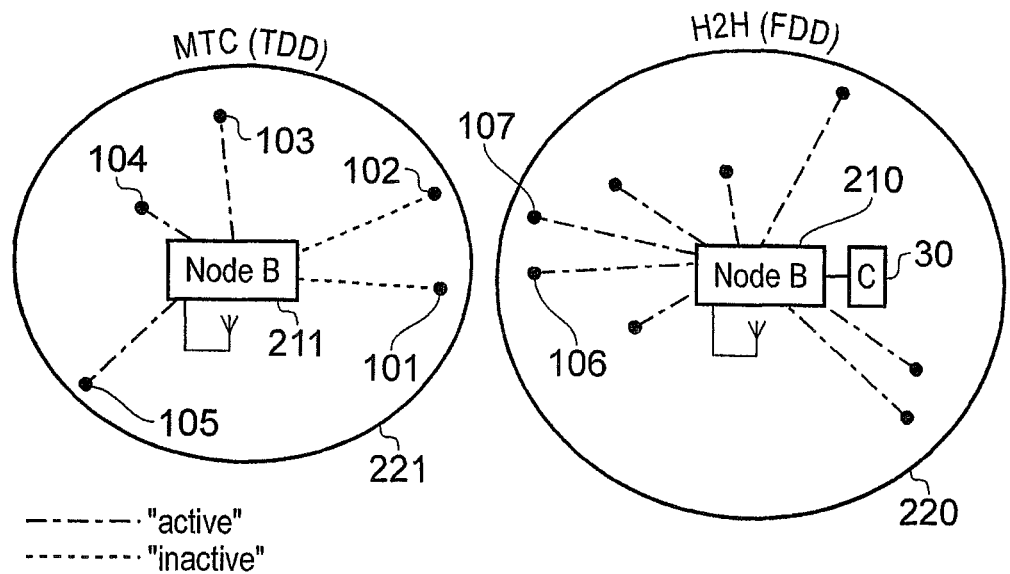
FIGS. 8A and 8B show an example of communications scheduling for reducing interference.
Figure 8B:
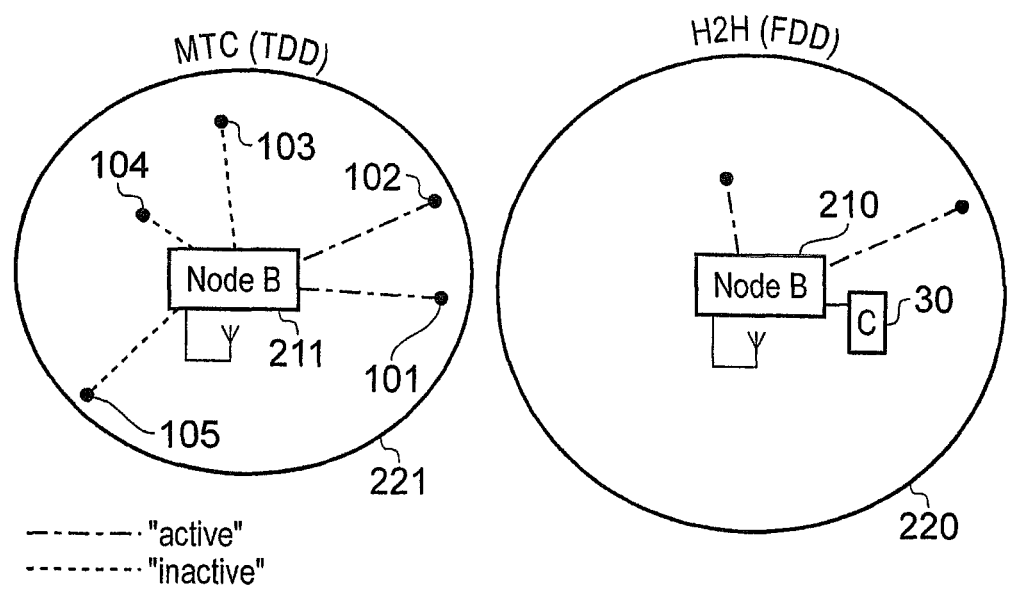

In the example of FIGS. 8A and 8B, the second base station 211 has been instructed to schedule traffic of the various terminals so as to avoid these terminals causing interference to H2H communications to and from the first base station 210.

In the situation shown in FIG. 8A, the first base station 210 is serving several H2H terminals where H2H traffic is still prioritized over MTC traffic generally being provided by the second base station 211. Because of the nature of H2H traffic, the first base station 210 is likely to be in use mainly during the day. In that situation, the controller 30 can generate instructions for the second base station 211 to schedule communication so as to reduce interference on the terminals communicating with the first base station 210 during the day more than during the night. Because MTC terminals 101 and 102 may cause interference to signals to and/or from the terminals served by the first base station 210 and neighbouring the MTC terminals 101-102 (for example H2H terminals 106-107), the controller 30 may instruct the second base station to schedule communications to and from MTC terminals 101-102 accordingly. For example the communications to and/or from terminals 101-102 can be scheduled when terminals 106-107 are not scheduled to send and/or receive communications such that the interference caused on H2H terminals 106-107 is minimized.

Alternatively and as illustrated in FIG. 8A, the controller may also generate instructions to put on hold or de-activate communications to terminals 101-102 when H2H terminals 106-107 are active. As a result, the second base station 211 may have only terminals 103-105 to communicate with when the H2H cell 220 is active, as those terminals will not cause interference in cell 220. The communications with terminals 101-102 may be suspended; limited to emergency or high priority communications; or reduced in order to limit the interference on the communications from/to the first base station 210.

At a different time of the day, for example at night, the cell 220 may be less active, as shown for example in FIG. 8B and the controller 30 can then generate instructions for the second base station 211 to increase the traffic allowance for MTC terminals 101-102. Alternatively, previous instructions may have set various parameters (e.g. day of week and time of day) for scheduling communications for these two terminals. The terminals 101-102 may then have an increased MTC traffic allowance with the second base station 211 compared to the situation as shown in FIG. 8A.

In an optional embodiment, when cell 220 is less busy, the controller can instruct the second base station 211 to also reduce the traffic allocation for the other MTC terminals 103-105 in order to increase the throughput available for MTC terminals 101-102, which may only have a short window of time to communicate with the second base station 211. This aspect is illustrated on FIG. 8B with the different types of line for MTC terminals 101-102 and 103-105.

In a further example, the controller 30 may be used in a Femtocell environment. If for example an industrial site is provided with a single base station effectively acting as both a GPRS and a 3G base station, the site manager may wish to use the 3G technology for human terminals only, because they require higher throughput and quality of service, and the GPRS technology for MTC-type or MTC-like terminals. This can provide the site manager with means to reduce costs for MTC-like communications by using the cheaper GPRS pricing. If GPRS communications cause interference in the 3G network, the controller 30 may help to reduce the amount of interference to a lower and acceptable level.

For example, if the controller 30 instructs the GPRS network to schedule communications so as to avoid or reduce interference in the H2H network, the MTC communications are likely to be limited or put on hold during the day, when employees are on site, and be carried out during the night, when employees are not on the site anymore. If however an employee needs to come back during the night and use the 3G network, the employee can then be prioritized over the other users of the network.

Likewise, the MTC terminals may be allowed to communicate for emergency messages during the day even if the 3G network is already very busy. For example, if a device in a building security system needs to send an alarm or if a medical device needs to send an urgent signal, they can be scheduled as very high priority traffic and therefore be given priority over not only other MTC traffic but also H2H traffic.

4. Frequency Switch

In a further example, the instructions may result in one or more terminals being switched to a different carrier frequency in order to reduce the amount of interference.

The controller may generate instructions so that part or all of the terminals communicating MTC traffic and causing interference to H2H traffic may be switched to a different carrier frequency, while still being served by the same base station. Preferably, the new carrier frequency should be chosen so as to avoid causing interferences in any of the carrier frequencies used by neighbouring base stations.

In one embodiment, the base station switches for all of its terminals from the current carrier frequency causing interference to higher priority traffic, to a second carrier frequency which is determined so as to not cause any interference to the higher priority traffic. In another example, the base station only switches frequencies for part of the base station sectors, thereby still using the first carrier frequency in other sectors.

SUMMARY

Figure 9:
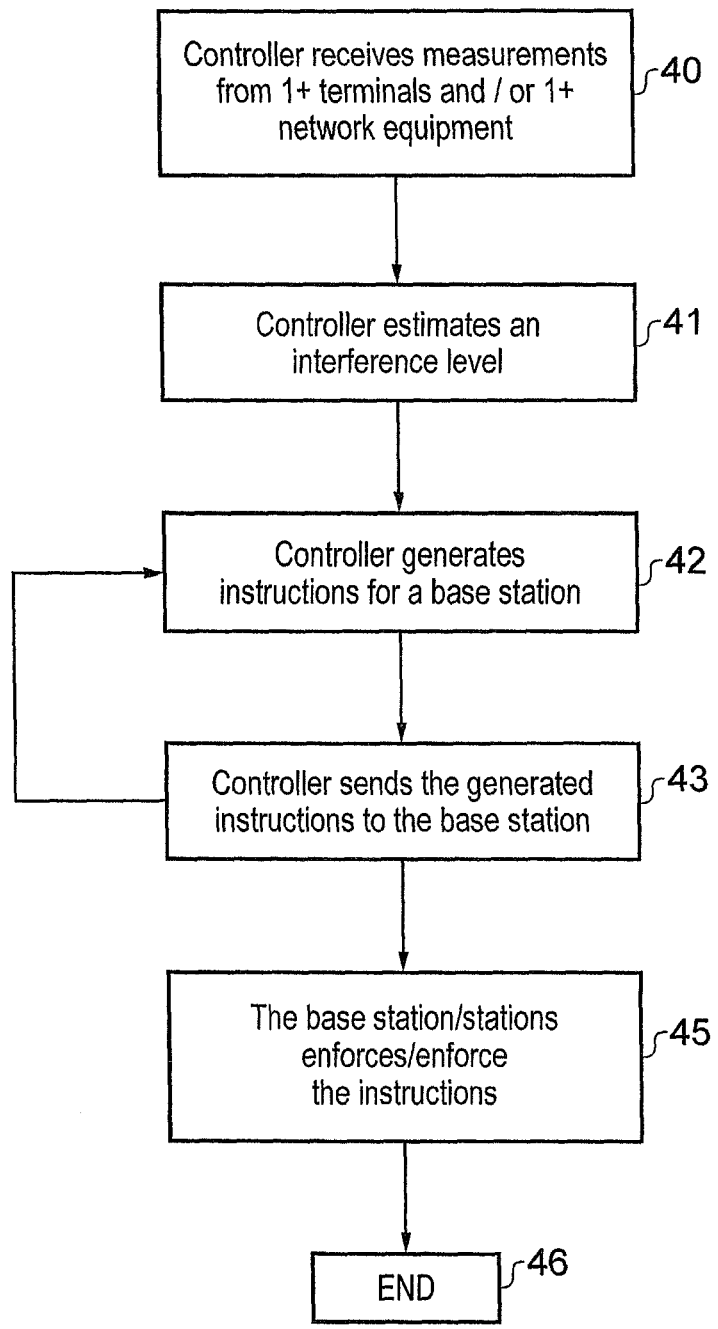
FIG. 9 shows a flow diagram illustrating a method of controlling interference within a mobile radio network.
Figure 10:
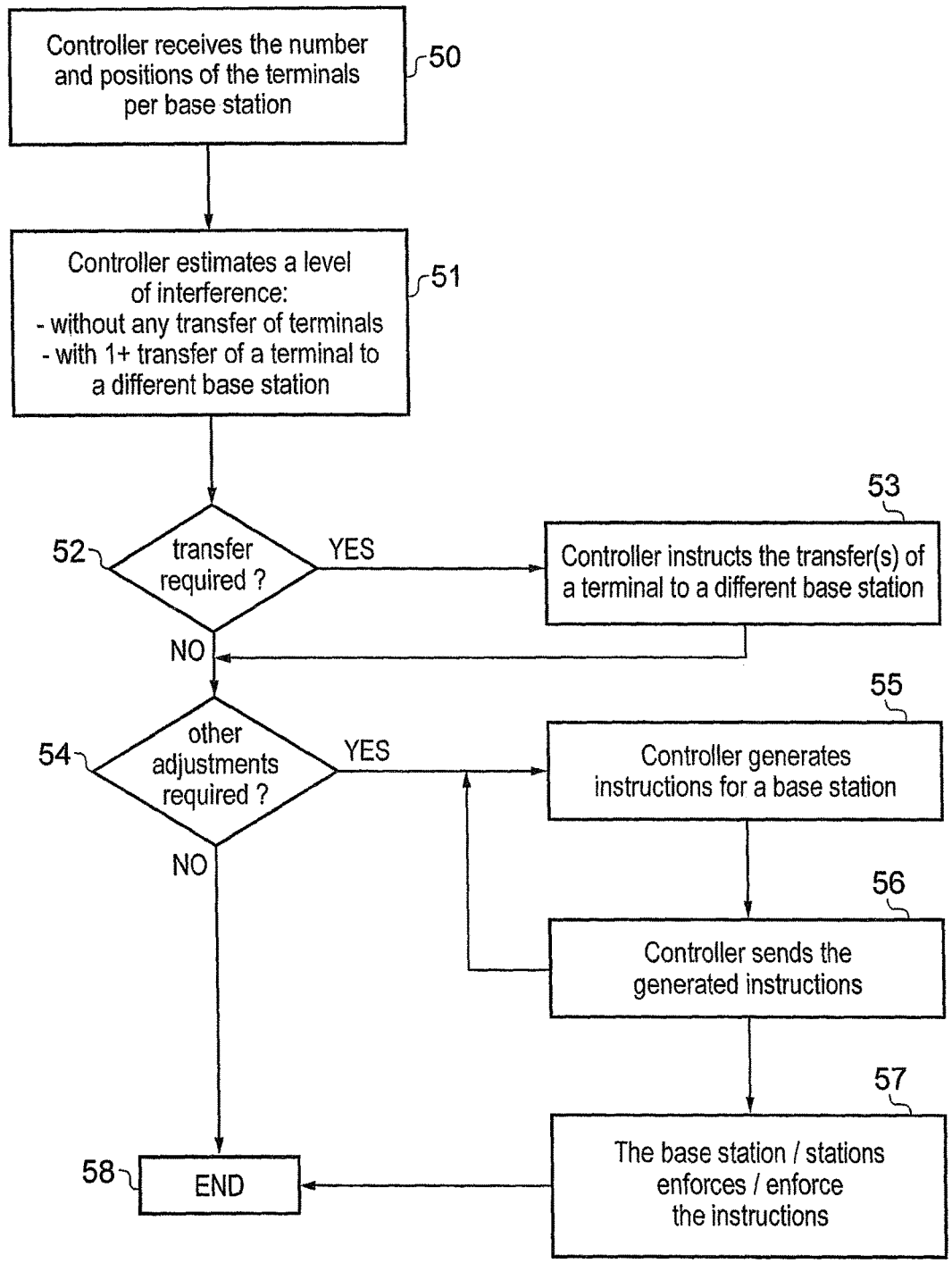
FIG. 10 shows a flow diagram illustrating another method of controlling interference within a mobile radio network.

In summary, FIGS. 9 and 10 show examples of methods for reducing interference.

In the example of the method of FIG. 9, at step 40, the controller first receives, directly or indirectly, measurements from one or more terminals and/or from one or more network equipment. For example, it may receive interference measurements reported by terminals and/or a transmission error indicator from base stations. The controller then estimates at step 41 an interference level created by base stations and/or terminals using a second type of traffic on base stations and/or terminals using a first type of traffic.

At step 42, the controller generates instructions for a base station and provides the base station with the instructions at step 43. This may be performed by for example sending the instructions to an intermediate element or module that is in charge of the distribution of instructions by sending the instructions to the base station, the terminals, etc. The instructions may include for example power control instructions, handover instructions, scheduling instructions, frequency switch instructions, any other suitable instructions or any combination thereof and may also comprise guidance in respect of some instructions having to be performed in particular order or in no particular order. The method may then either return to step 42 for generating new instructions, for example for another base station, or it may move to the next step. If instructions are required for two or more base stations, the controller may also simply generate all instructions at once for all (or part) of the relevant base stations (not shown).

The base stations having received instructions then enforce the instructions at step 45 in order to achieve the expected interference reduction by for example enforcing any of the instructions discussed above or by sending the instructions to another node for enforcement (e.g. a terminal or a base station).

The method then ends at step 46, but alternatively, the method can immediately loop back to step 40 (not shown), or there may be a certain delay before the method, or part of it, is performed again. It will be apparent to the skilled person that, depending on the context, the method may be performed periodically, or that several loops may be performed when necessary, for example for initial adjustments, in order to reach a stable and optimized arrangement and/or for a continuous optimization. Also, some of the steps may be performed more often than the others, for example steps 42, 43.

FIG. 10 shows another example of a method for optimizing the use of radio resources by reducing interference. In this example, a controller mainly or only uses information relating to the number of and positions of terminals for each base station (cf. step 50). At step 51, the controller estimates interference between different types of traffic of the base stations taking into account situations where no terminal is transferred to another base station and where one or more terminals is transferred. Alternatively, the controller may also consider situations where a terminal is disconnected from its base station without being transferred to another one (not shown).

Depending on whether a suitable transfer is required for optimization (step 52), the controller may instruct the transfer of one or more terminal from one base station to another one accordingly (step 53). They can be instructed independently or by groups of terminals.

Optionally, the controller may then consider whether other adjustments are required (step 54), for example power control, communications scheduling and/or frequency switch adjustments. If not, the method may end (step 58) or loop back to step 50 (not shown). If other adjustments are required, the controller then generates instructions accordingly (step 55) and provides the base station with the instructions (step 56). The controller may either then return to step 55 for generating new instructions. Alternatively, the controller may send instructions for all of the base stations or to a group of them (not shown) rather than sending them individually to each of the recipient base stations. The base stations having received instructions then enforce the instructions at step 57. The method can then end (step 58) or loop back to step 50 (not shown).

Other Applications and Examples

The controller 30 is not limited to the particular examples given above as will be understood by the skilled person. Non-exhaustive examples of modifications and alternatives are described below.

For example, the controller may take a number of factors into consideration for generating the instructions. These factors may include information such as interference measurements and/or indicators; an interference estimation; signal quality measurements and/or indicators (which may be affected by interference and possibly other factors); a power setting of any of the base stations and/or terminal; a base station's capacities; a terminal's capacities; a terminal's ID; a terminal's profile (including for example a mobility profile and/or a priority profile); a base station's ID; a base station's profile; a number of terminals served by any of the base stations; a set of priority parameters (e.g. H2H prioritized over MTC); and any combination of the above. All this information may originate from a terminal, a base station or any other element and/or may be pre-set parameters. These factors may also include further parameters, for example, a priority for one or more base station; a priority index for one or more type of services; and sensitivity to time-delay.

The mobile operators are also provided with more flexibility owing to the variety and number of parameters that can be considered for generating the instructions. If for example an operator wants H2H to be prioritized over MTC during only the day and MTC to be prioritized over H2H only, for example, between 01:00 and 05:00 during the night, then the operator can readily adjust the parameters for generating the instructions accordingly.

The type of terminal may also be included in the terminal's profile and may for example include: MTC, H2H, emergency device, unknown, etc. In an environment where the mobile operator of a network wants to prioritize H2H traffic over MTC traffic, the profile of a terminal may be used when generating the instructions, for example to identify the type of traffic from and to this terminal, or in combination with other traffic identification means, to ensure that the quality of service for H2H traffic is prioritized over the quality of service for MTC communications.

A mobility profile may for example be: mobile, stationary, mobile during certain hours and stationary during other hours, unknown, etc. For example, a mobile phone would then have a "mobile" profile, whilst a vending machine would have a "stationary profile". This profile may play a role in generating the instructions as interferences caused by a stationary terminal are more predictable and less changing than those of a mobile terminal. Therefore, a controller estimating the interference caused or likely to be caused by signals from a terminal may include a bigger margin (if any) for mobile terminals, due to the fact that the interference is likely to change with their position, than for stationary terminals.

The priority profile can indicate priorities for terminals which can be used in addition to the traffic priorities already considered when generating instructions.

The number of mobile stations served by any of the base stations may also be taken into consideration. For example, in a first network for a first type of traffic prioritized over a second type of traffic in a second network, the more terminals are served in the first network, the less the second network may be allowed to cause interferences. Also, when the number of terminals served by the first network decreases, the second network may be less limited by the first network and can be allowed to use more of its capacities. As a result, the traffic between the two networks would then automatically be regulated with more traffic within the first network for the first type of traffic, when needed, and with more traffic within the second network for the second type of traffic, when the first network is less used. This is particularly suitable to an MTC/H2H combination, where a H2H network has high real-time requirements while an MTC network has usually a higher acceptance of delay.

The instructions generated by the controller aim at reducing interference and take into consideration various traffic types and their respective priorities, and therefore enable an optimization of the radio resources utilization of the mobile radio network. Such instructions may include appropriate instructions to that effect and can, for example, include instructions from the following non-exhaustive list: instructions to increase or reduce the power of DL and/or UL transmissions; instructions to increase or reduce the amount of redundancy in communications; instructions to keep interferences below a certain level, e.g. by providing a base station with an interference budget; instructions to handover one or more terminals to a different base station; and instructions to switch the carrier frequency used by one or more terminals to a different carrier frequency. They may also be generated for one base station or a group of base stations, for one terminal or a group of terminals, for one network controller or a group of network controllers, or for one suitable element or group of suitable of elements.

These instructions may be generated automatically; on demand; dynamically, for example when an interference threshold is reached; or in any combination of those.

An enforcement apparatus may be provided for enforcing the instructions, where the enforcement apparatus can be provided as an independent element physically and/or logically, or at least part of it may be comprised in another element. For example, if a mobile network comprises a first base station dedicated to H2H and another base station dedicated to MTC traffic, the controller may be part of the H2H base station while the enforcer may be part of the MTC base station. Thus the H2H base station and the MTC base station can be set up as a master and slave (respectively) system.

As a result of the instructions being enforced, the quality of service for some of the terminals may be stable, increase or decrease. It may be that a terminal for high priority traffic, or served by a high priority base station, will have an increased quality of service (resulting for example in the cancellation of interference), while a terminal for low priority traffic terminal may experience a loss of quality of service, or a loss of service in some instances.

Various modifications can be made to the embodiments described above without departing from the scope of the invention which is defined by the appended claims. In particular, any feature disclosed in one example or embodiment can be combined with any other suitable feature of any other part of the description, so long as the combination is technically possible. It is intended that the invention covers any possible combination of features disclosed in the application which is within the scope of the claims. It will also be appreciated that the invention can be applied to various forms of mobile network including, but not limited to, GSM; GPRS; EDGE; 3G; UMTS; HDSPA/HSUPA; CDMA2000; LTE; etc. Furthermore, although the examples have been described in the context of 3GPP standards, the invention is not limited to a use in a 3GPP environment and, if used in a 3GPP environment, is not limited to the currently existing standardized architectures, protocols, etc. Moreover, the term user equipment as used herein can be replaced with communications device, mobile communications device, mobile unit, etc.

The invention claimed is:

1. A mobile communications system comprising:
a first group of one or more base stations which are arranged to communicate signals with mobile units via a wireless access interface by transmitting and/or receiving radio signals within a first frequency band;
a second group of one or more base stations which are arranged to communicate signals with mobile units via a wireless access interface by transmitting and/or receiving radio signals within a second frequency band; and a controller, wherein the controller is arranged in operation to:

determine an amount of interference in the first frequency band to radio signals for a first type of traffic where the interference is caused by radio signals for a second type of traffic in the second frequency band by calculating an amount of interference which is tolerated by the radio signals for the first type of traffic by transmission of the radio signals for the second type of traffic, wherein:

the radio signals for the first type of traffic are to and/or from a first base station of the first group; and the radio signals for the second type of traffic are to and/or from to a second base station of the second group; and in response to the calculated amount of interference, generate instructions to control transmission of the radio signals for the second type of traffic in the second frequency band to be within the amount of interference which is tolerated by the radio signals for the first type of traffic, wherein the instructions are generated based on at least a priority for the first type of traffic and a priority for the second type of traffic and the calculated amount of interference is a function of an amount of communications traffic provided by the first group of one or more base stations to the attached mobile units.

2. The mobile communications system of claim 1, wherein the first group of one or more base stations is comprised in a first radio network and the second group of one or more base stations is comprised in a second radio network.

3. The mobile communications system of claim 1, wherein the interference in the first frequency band caused by radio signals transmitted in the second frequency band is out of band interference caused by the second frequency band neighboring the first frequency band.

4. The mobile communications system of claim 1, wherein the second group of one or more base stations includes enforcement apparatus which is arranged in operation to receive the generated instructions and to enforce the instructions to reduce the determined interference.

5. The mobile communications system of claim 1, wherein generated instructions comprise power control instructions in respect of one or more mobile unit and/or of one or more base station of the second group of one or more base stations.

6. The mobile communications system of claim 1, wherein the generated instructions comprise instructions to transfer a mobile unit attached to a base station to a different base station.

7. The mobile communications system of claim 6, wherein the generated instructions to transfer a mobile unit are generated using geometry measurements.

8. The mobile communications system of claim 1, wherein the generated instructions comprise instructions to change at least part of the communications for the second type of traffic in the second frequency band to a different carrier frequency band or a different carrier frequency within the second frequency band.

9. The mobile communications system of claim 1, wherein the instructions include an interference budget for interference that the communications for the second type of traffic in the second frequency band is allowed to cause to the communications for the first type of traffic in the first frequency band.

10. The mobile communications system of claim 1, wherein the first group and second group are connected to core network entities and the instructions are communicated via the core network entities.

11. The mobile communications system of claim 1, wherein the first group and second group are predominantly used for, respectively, human-to-human communications and machine-type communications.

12. The mobile communications system of claim 1, wherein at least one of the first and second groups is arranged to communicate with at least one of a 3GPP-compliant mobile unit, a UMTS-compliant mobile unit and a LTE-compliant mobile unit.

13. The mobile communications system of claim 1, wherein the controller is located at least partially in a base station.

14. The mobile communications system of claim 1, wherein the controller is located at least partially in a radio network controller.

15. The mobile communications system of claim 1, wherein at least one of the first and second groups is arranged to communicate using TDD and/or FDD duplex modes.

16. The mobile communications system of claim 1, wherein the controller is arranged in operation to use the profile of a mobile unit for generating the instructions.

17. The mobile communications system of claim 16, wherein the profile of a mobile unit comprise at least one of a mobility profile and a priority profile.

18. The mobile communications system of claim 1, wherein the generated instructions are instructions in respect of one or more mobile unit and/or in respect of one or more base station.

19. The mobile communications system of claim 1, wherein the controller being arranged in operation to determine an amount of interference further comprises the controller being arranged in operation to estimate at least part of the interference.

20. A mobile communications device for use in the mobile communications system of claim 1.

21. A method of communicating in a mobile communications system, the mobile communication system comprising a first group of one or more base stations which are arranged to communicate signals with mobile units via a wireless access interface by transmitting and/or receiving radio signals within a first frequency band and a second group of one or more base stations which are arranged to communicate signals with mobile units via a wireless access interface by transmitting and/or receiving radio signals within a second frequency band; the method comprising the steps of:

determining an amount of interference in the first frequency band to radio signals for a first type of traffic where the interference is caused by radio signals for a second type of traffic in the second frequency band by calculating an amount of interference which is tolerated by the radio signals for the first type of traffic by transmission of the radio signals for the second type of traffic, wherein:

the radio signals for the first type of traffic are to and/or from a first base station of the first group; and the radio signals for the second type of traffic are to and/or from to a second base station of the second group; and in response to the calculated amount of interference, generating instructions to control transmission of the radio signals for the second type of traffic in the second frequency band to be within the amount of interference which is tolerated by the radio signals for the first type of traffic, wherein the instructions are generated based on at least a priority for the first type of traffic and a priority for the second type of traffic and the calculated amount of interference is a function of an amount of communications traffic provided by the first group of the one or more base stations to the attached mobile units.

22. The method of claim 21, wherein the first group of one or more base stations is comprised in a first radio network and the second group of one or more base stations is comprised in a second radio network.

23. The method of claim 21, wherein the interference in the first frequency band caused by radio signals transmitted in the second frequency band is out of band interference caused by the second frequency band neighboring the first frequency band.

24. The method of any of claim 21, the method further comprising:
an enforcement apparatus in the second group of one or more base stations receiving the generated instructions in the second; and
the enforcement apparatus enforcing the instructions to reduce the determined interference.

25. The method of claim 21, wherein generated instructions comprise power control instructions in respect of one or more mobile unit and/or of one or more base station of the second group of one or more base stations.

26. The method of claim 21, wherein the generated instructions comprise instructions to transfer a mobile unit attached to a base station to a different base station.

27. The method of claim 26, wherein the generated instructions to transfer a mobile unit are generated using geometry measurements.

28. The method of claim 21, wherein the generated instructions comprise instructions to change at least part of the communications for the second type of traffic in the second frequency band to a different carrier frequency band or a different carrier frequency within the second frequency band.

29. The method of claim 21, wherein the instructions include an interference budget for interference that the communications for the second type of traffic in the second frequency band is allowed to cause to the communications for the first type of traffic in the first frequency band.

30. The method of claim 21, wherein the first group and second group are connected to core network entities and the instructions are communicated via the core network entities.

31. The method of claim 21, wherein the first group and second group are predominantly used for, respectively, human-to-human communications and machine-type communications.

32. The method of claim 21, wherein at least one of the first and second groups is arranged to communicate with at least one of a 3GPP-compliant mobile unit, a UMTS-compliant mobile unit and a LTE-compliant mobile unit.

33. The method of claim 21, wherein at least one of the first and second groups is arranged to communicate using TDD and/or FDD duplex modes.

34. The method of claim 21, the method further comprising using the profile of a mobile unit for generating the instructions.

35. The method of claim 34, wherein the profile of a mobile unit comprise at least one of a mobility profile and a priority profile.

36. The method of claim 21, wherein the generated instructions are instructions in respect of one or more mobile unit and/or in respect of one or more base station.

37. The method of claim 21, wherein the step of determining an amount of interference further comprises estimating at least part of the interference.

38. An apparatus for communicating in a mobile communications system, the mobile communication system comprising a first group of one or more base stations which are arranged to communicate signals with mobile units via a wireless access interface by transmitting and/or receiving radio signals within a first frequency band and a second group of one or more base stations which are arranged to communicate signals with mobile units via a wireless access interface by transmitting and/or receiving radio signals within a second frequency band; the apparatus comprising a controller configured to:
determine an amount of interference in the first frequency band to radio signals for a first type of traffic where the interference is caused by radio signals for a second type of traffic in the second frequency band by calculating an amount of interference which is tolerated by the radio signals for the first type of traffic by transmission of the radio signals for the second type of traffic, wherein:
the radio signals for the first type of traffic are to and/or from a first base station of the first group; and
the radio signals for the second type of traffic are to and/or from to a second base station of the second group; and
in response to the calculated amount of interference, generate instructions to control transmission of the radio signals for the second type of traffic in the second frequency band to be within the amount of interference which is tolerated by the radio signals for the first type of traffic, wherein the instructions are generated based on at least a priority for the first type of traffic and a priority for the second type of traffic and the calculated amount of interference is a function of an amount of communications traffic provided by the first group of one or more base stations to the attached mobile units.

* * * * *

UNITED STATES PATENT AND TRADEMARK OFFICE
CERTIFICATE OF CORRECTION

PATENT NO. : 9,554,287 B2  
APPLICATION NO. : 13/983459  
DATED : January 24, 2017  
INVENTOR(S) : Martin Warwick Beale Page 1 of 1

It is certified that error appears in the above-identified patent and that said Letters Patent is hereby corrected as shown below:

In the Specification

In Column 7, Line 34, after --base station to an FDD-- please insert --terminal.--

Signed and Sealed this
Thirtieth Day of May, 2017

Michelle K. Lee
*Director of the United States Patent and Trademark Office*